United States Patent
Chen et al.

(10) Patent No.: US 8,482,705 B2
(45) Date of Patent: Jul. 9, 2013

(54) METHOD OF FABRICATING TRANSFLECTIVE DISPLAYS

(71) Applicant: AU Optronics Corp, Hsinchu (TW)

(72) Inventors: Ying-Ru Chen, Hsinchu (TW); Tzu-Yuan Lin, Hsinchu (TW); Ching-Huan Lin, Hsinchu (TW); Chih-Ming Chang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 13/654,729

(22) Filed: Oct. 18, 2012

(65) Prior Publication Data

US 2013/0040527 A1 Feb. 14, 2013

Related U.S. Application Data

(62) Division of application No. 11/942,747, filed on Nov. 20, 2007, now Pat. No. 8,330,908.

(30) Foreign Application Priority Data

Feb. 16, 2007 (TW) .............................. 96106098 A

(51) Int. Cl.
*G02F 1/1335* (2006.01)
*G02B 1/12* (2006.01)
*H01J 9/00* (2006.01)

(52) U.S. Cl.
USPC ........... 349/114; 349/106; 264/1.9; 264/1.38; 445/24

(58) Field of Classification Search
USPC .............. 349/114, 106; 264/1.38, 1.9; 445/24
See application file for complete search history.

(56) References Cited

U.S. PATENT DOCUMENTS

| 6,600,536 B1* | 7/2003 | Kuwabara et al. ............ 349/117 |
| 7,167,223 B2 | 1/2007 | Tanaka et al. |
| 2001/0043297 A1 | 11/2001 | Arai |
| 2004/0032549 A1 | 2/2004 | Seki et al. |
| 2004/0212764 A1 | 10/2004 | Tanaka et al. |
| 2005/0270449 A1* | 12/2005 | Koma et al. .................. 349/114 |

(Continued)

FOREIGN PATENT DOCUMENTS

| CN | 1540400 | 10/2004 |
| CN | 1544986 | 11/2004 |
| TW | 200300036 | 6/1987 |

OTHER PUBLICATIONS

Chinese language office action dated Apr. 18, 2008.
Taiwanese language office action dated Jun. 7, 2011.

*Primary Examiner* — Mark Robinson
*Assistant Examiner* — Jerry Blevins
(74) *Attorney, Agent, or Firm* — McClure, Qualey & Rodack, LLP

(57) ABSTRACT

A method of fabricating a transflective display. The method includes providing a first substrate; forming a first electrode thereon; providing a second substrate having a reflective area and a transmissive area opposite to the first substrate; forming a second electrode having a plurality of slits on the second substrate opposite to the first electrode; disposing a liquid crystal layer including a plurality of liquid crystal molecules and monomers between the first electrode and the second electrode, wherein the monomers have a weight ratio of about 0.1-20%; and polymerizing the monomers to form a plurality of non-liquid crystal polymers adjacent to the first electrode and the second electrode.

9 Claims, 4 Drawing Sheets

U.S. PATENT DOCUMENTS

| | | |
|---|---|---|
| 2006/0023146 A1* | 2/2006 | Yang et al. .................... 349/114 |
| 2006/0170846 A1* | 8/2006 | Ozawa .......................... 349/114 |
| 2006/0209232 A1 | 9/2006 | Komitov et al. |
| 2006/0244887 A1 | 11/2006 | Lin et al. |
| 2007/0091235 A1 | 4/2007 | Tanaka et al. |
| 2007/0126957 A1* | 6/2007 | Kim et al. ..................... 349/114 |
| 2007/0195239 A1* | 8/2007 | Lee et al. ...................... 349/114 |

* cited by examiner

METHOD OF FABRICATING TRANSFLECTIVE DISPLAYS

CROSS REFERENCE TO RELATED APPLICATIONS

This application is a Divisional of U.S. patent application Ser. No. 11/942,747, filed Nov. 20, 2007 and entitled "method of fabricating transflective displays", which claims priority of Taiwan Patent Application No. 96106098, filed on Feb. 16, 2007, the entireties of which are incorporated by reference herein.

BACKGROUND OF THE INVENTION

1. Field of the Invention

The invention relates to a method of fabricating a liquid crystal display, and in particular to a method of fabricating a transflective display.

2. Description of the Related Art

Liquid crystal display (LCD) is widely used in various electronic products such as portable personal computers, digital cameras, or projectors due to slimness and low power consumption.

Unlike conventional cathode ray tube (CRT) and electroluminescent (EL) displays, liquid crystal display panels are unilluminated. Currently, transmissive liquid crystal displays are popular. The backlight source of the display controls light transmission. However, the backlight source accounts for 50% or more of total power consumption, a problem where power conservation is important. Additionally, in brighter environments, the viewability of the transmissive liquid crystal display becomes limited.

Reflective liquid crystal displays suitable for use outdoors and in portable conditions utilize reflection of environmental light rather than a backlight source. Generally, the reflective liquid crystal display comprises twisted nematic (TN) and super twisted nematic (STN) modes.

However, when the environment is dark, viewability of the reflective liquid crystal display is limited.

To improve the display quality in bright environments, increased light intensity of a backlight source is required. Power consumption, however, is increased. Further, the display quality is reduced when directly exposed under sunlight or other light sources, or when the liquid crystal display screen receives sunlight or a light source, surrounding images are reflected.

To improve the problem, the transmissive and reflective liquid crystal displays are combined in a transflective liquid crystal display.

In liquid crystal alignment, the multi-domain vertical alignment (MVA) is used in conventional transflective liquid crystal display. The protrusions disposed on reflective area control the pretilt angles of the liquid crystal molecules. However, such technique is complex, affecting transmissive contrast, aspect ratio, and response speed.

BRIEF SUMMARY OF THE INVENTION

The invention provides a method of fabricating a transflective display, in which a first substrate is provided. A first electrode is formed on the first substrate. A second substrate having a reflective area and a transmissive area is provided, opposite to the first substrate. A second electrode having a plurality of slits is formed on the second substrate, opposite to the first electrode. A liquid crystal layer comprising a plurality of liquid crystal molecules and monomers is disposed between the first electrode and the second electrode, wherein the monomers have a weight ratio of about 0.1-20%. The monomers are polymerized to form a plurality of non-liquid crystal polymers adjacent to the first electrode and the second electrode.

The transflective display with polymer stabilized alignment (PSA) and multi-domain vertical alignment (MVA) improves transmissive contrast, aspect ratio, and response speed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
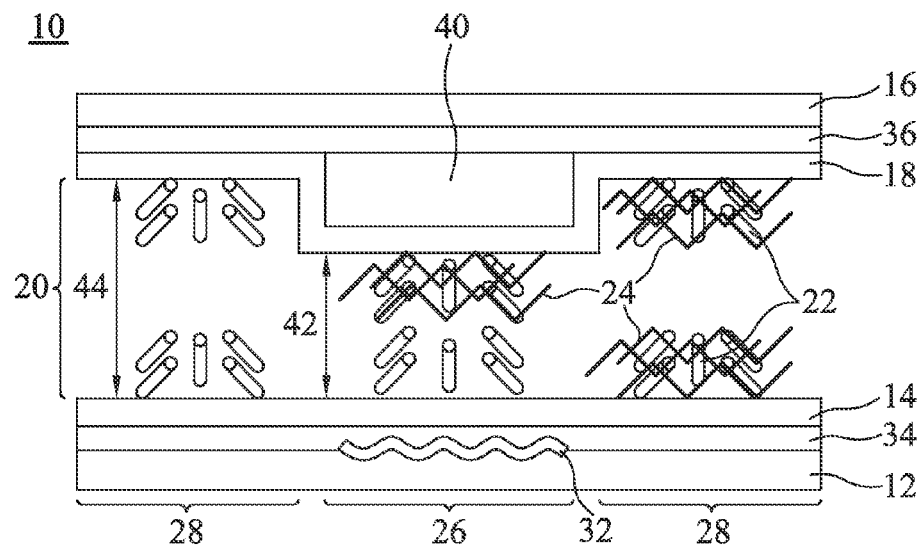
FIG. 1 shows a transflective display comprising polymers in an embodiment of the invention.

In an embodiment, a transflective display is shown in FIG. 1. The transflective display 10 comprises a first substrate 16, a first electrode 18, a second substrate 12, a second electrode 14, and a liquid crystal layer 20 comprising a plurality of liquid crystal molecules 22 and non-liquid crystal polymers 24.

The second substrate 12 has a reflective area 26 and a transmissive area 28. The second electrode 14 is formed on the second substrate 12. The first substrate 16 is opposite to the second substrate 12. The first electrode 18 is formed on the first substrate 16, opposite to the second electrode 14. The liquid crystal layer 20 is disposed between the first electrode 18 and the second electrode 14.

Figure 2:
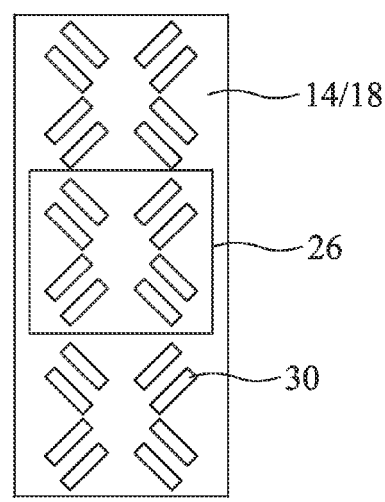
FIG. 2 shows an electrode structure of a transflective display in an embodiment of the invention.

The second electrode 14 or the first electrode 18 may have a plurality of slits 30 (as shown in FIG. 2) to align the liquid crystal molecules 22. The transflective display 10 further comprises a reflective layer 32 disposed on the reflective area 26 of the second substrate 12. The reflective layer 32 may be any material with high reflectivity such as aluminum. The transflective display 10 further comprises an insulation layer 34 formed between the reflective layer 32 and the second electrode 14.

Figure 3:
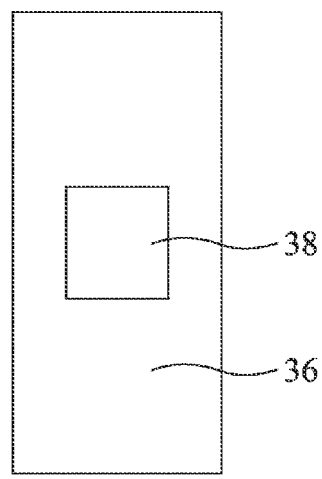
FIG. 3 shows a color filter structure of a transflective display in an embodiment of the invention.

The transflective display 10 further comprises a color filter 36 formed between the first substrate 16 and the first electrode 18. Generally, the color filter 36 corresponding to the reflective area 26 may have a hole 38 (as shown in FIG. 3) to increase light transmission. The transflective display 10 further comprises a dielectric layer 40 formed between the color filter 36 and the first electrode 18 corresponding to the reflective area 26.

Most of the non-liquid crystal polymers 24 formed in the liquid crystal layer 20 are adjacent to the first electrode 18 and the second electrode 14 to effectively control the pretilt angles of the liquid crystal molecules 22. Additionally, the liquid crystal layer 20 has different heights, for example, the liquid crystal layer 20 corresponding to the reflective area 26 has a first height 42 and the liquid crystal layer 20 corresponding to the transmissive area 28 has a second height 44. The second height 44 may be 1.5 to 2.5 times the first height 42.

Figure 4:
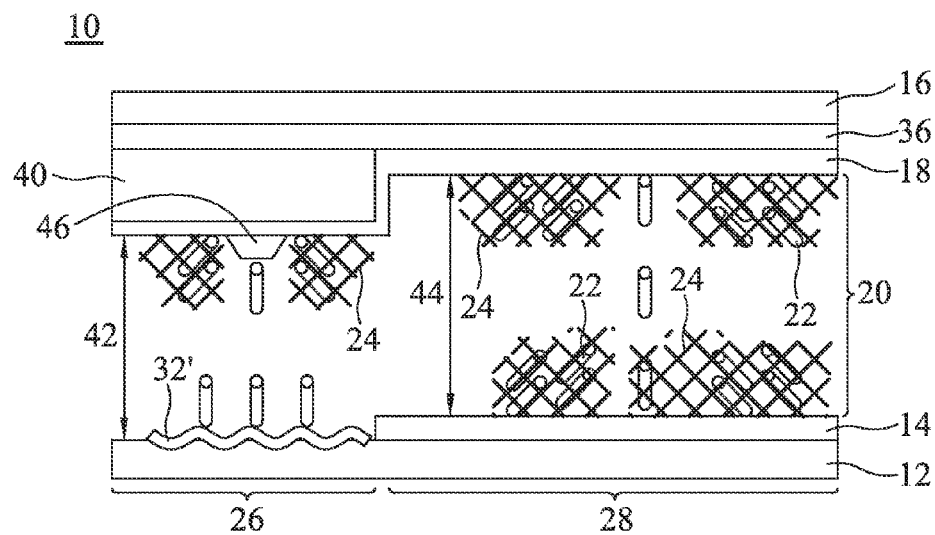
FIG. 4 shows a transflective display comprising polymers in an embodiment of the invention.

In another embodiment, a transflective display is shown in FIG. 4. The transflective display 10 comprises a first substrate 16, a first electrode 18, a second substrate 12, a second electrode 14, and a liquid crystal layer 20 comprising a plurality of liquid crystal molecules 22 and non-liquid crystal polymers 24.

The second substrate 12 has a reflective area 26 and a transmissive area 28. The second electrode 14 is formed on the second substrate 12. The first substrate 16 is opposite to the second substrate 12. The first electrode 18 is formed on the first substrate 16, opposite to the second electrode 14. The liquid crystal layer 20 is disposed between the first electrode 18 and the second electrode 14.

Figure 5:
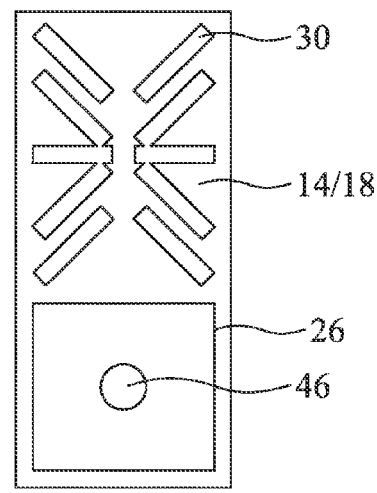
FIG. 5 shows an electrode structure of a transflective display in an embodiment of the invention.

The second electrode 14 or the first electrode 18 may have a plurality of slits 30 (as shown in FIG. 5) to align the liquid crystal molecules 22. A protrusion 46 disposed on the first electrode 18 corresponding to the reflective area 26 is also used to align the liquid crystal molecules 22 (as shown in FIG. 5). The transflective display 10 further comprises a reflective electrode 32' disposed on the reflective area 26 of the second substrate 12. The reflective electrode 32' may be any material with a high reflectivity such as aluminum.

The transflective display 10 further comprises a color filter 36 formed between the first substrate 16 and the first electrode 18. Generally, the color filter 36 corresponding to the reflective area 26 may have a hole 38 to increase light transmission. The transflective display 10 further comprises a dielectric layer 40 formed between the color filter 36 and the first electrode 18 corresponding to the reflective area 26.

Most of the non-liquid crystal polymers 24 formed in the liquid crystal layer 20 are adjacent to the first electrode 18 and the second electrode 14 to effectively control the pretilt angles of the liquid crystal molecules 22. Additionally, the liquid crystal layer 20 has different heights, for example, the liquid crystal layer 20 corresponding to the reflective area 26 has a first height 42 and the liquid crystal layer 20 corresponding to the transmissive area 28 has a second height 44. The second height 44 may be 1.5 to 2.5 times the first height 42.

Figure 6:
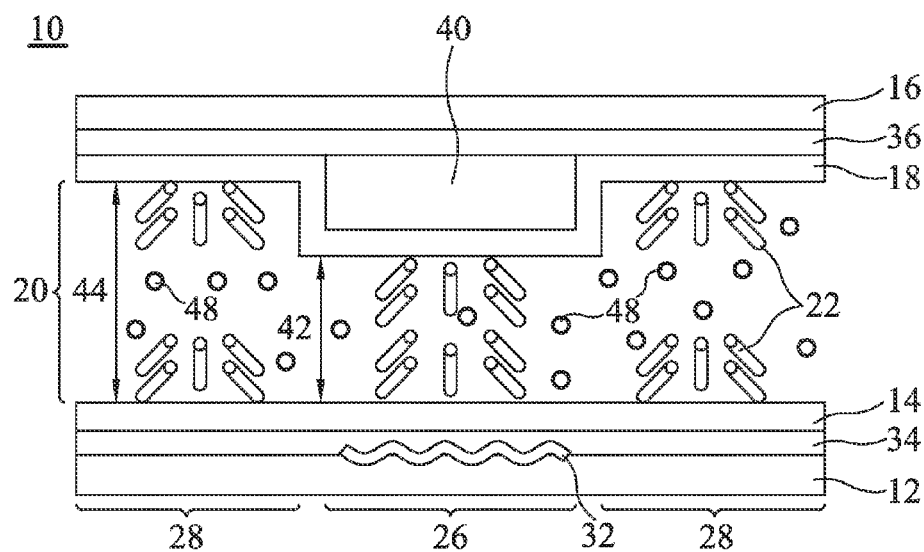
FIG. 6 shows a transflective display comprising monomers in an embodiment of the invention.

An embodiment of a method of fabricating a transflective display is shown in FIG. 6. A first substrate 16 and a second substrate 12 having a reflective area 26 and a transmissive area 28 are provided. The first substrate 16 is opposite to the second substrate 12. A color filter 36 is then formed on the first substrate 16. Next, a dielectric layer 40 is formed on the color filter 36 corresponding to the reflective area 26 of the second substrate 12. A first electrode 18 is then formed on the dielectric layer 40 and the color filter 36.

A reflective layer 32 is formed on the reflective area 26 of the second substrate 12. An insulation layer 34 is then formed on the reflective layer 32 and the second substrate 12. Next, a second electrode 14 is formed on the insulation layer 34. The second electrode 14 is opposite to the first electrode 18. The first and second electrodes may have a plurality of slits 30 (as shown in FIG. 2).

A liquid crystal layer 20 comprising a plurality of liquid crystal molecules 22 and monomers 48 is disposed between the first electrode 18 and the second electrode 14. The monomers 48 have a weight ratio of about 0.1 to 20%, also 0.1 to 5%.

Next, the monomers 48 are polymerized by irradiation such as ultraviolet or heating to form a plurality of non-liquid crystal polymers 24 (as shown in FIG. 1). The non-liquid crystal polymers 24 are adjacent to the first electrode 18 and the second electrode 14.

A hole 38 (as shown in FIG. 3) may be created in the color filter 36 corresponding to the reflective area 26 to increase light transmission, facilitating the polymerization of the monomers 48 corresponding to the reflective area 26 during ultraviolet irradiation.

Figure 7:
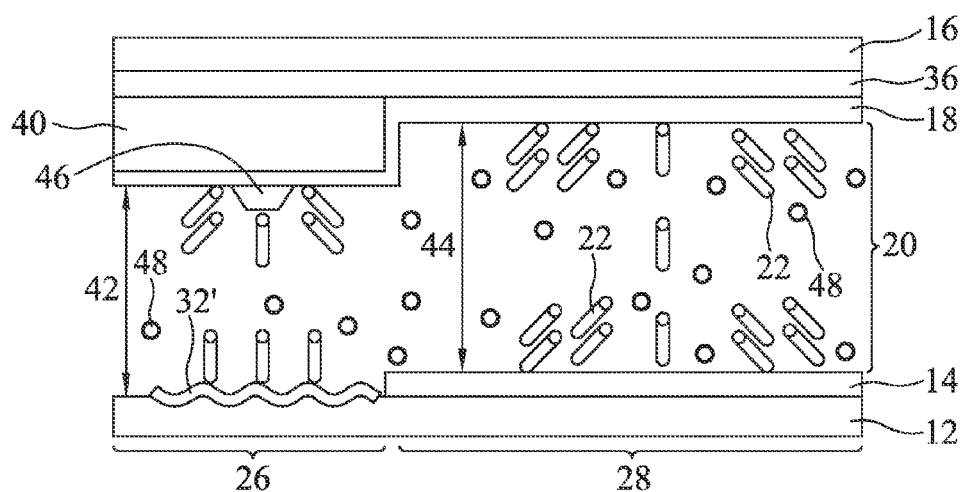
FIG. 7 shows a transflective display comprising monomers in an embodiment of the invention.

Another embodiment of a method of fabricating a transflective display is shown in FIG. 7. A first substrate 16 and a second substrate 12 having a reflective area 26 and a transmissive area 28 are provided. The first substrate 16 is opposite to the second substrate 12. A color filter 36 is then formed on the first substrate 16. Next, a dielectric layer 40 is formed on the color filter 36 corresponding to the reflective area 26 of the second substrate 12. A first electrode 18 is then formed on the dielectric layer 40 and the color filter 36.

A reflective electrode 32' is formed on the reflective area 26 of the second substrate 12. Next, a second electrode 14 is formed on the second substrate 12. The second electrode 14 is opposite to the first electrode 18. The first and second electrodes may have a plurality of slits 30 (as shown in FIG. 2).

A liquid crystal layer 20 comprising a plurality of liquid crystal molecules 22 and monomers 48 is disposed between the first electrode 18 and the second electrode 14. The monomers 48 have a weight ratio of about 0.1 to 20%, also 0.1 to 5%.

A protrusion 46 is further formed on the first electrode 18 corresponding to the reflective area 26 to align the liquid crystal molecules 22.

Next, the monomers 48 are polymerized by irradiation such as ultraviolet or heating to form a plurality of non-liquid crystal polymers 24 (as shown in FIG. 4). The non-liquid crystal polymers 24 are adjacent to the first electrode 18 and the second electrode 14.

A hole 38 (as shown in FIG. 3) may be created in the color filter 36 corresponding to the reflective area 26 to increase light transmission, facilitating the polymerization of the monomers 48 corresponding to the reflective area 26 during ultraviolet irradiation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fabricating a transflective display, comprising:

providing a first substrate;

forming a first electrode thereon;

providing a second substrate having a reflective area and a transmissive area opposite to the first substrate;

forming a second electrode having a plurality of slits on the second substrate opposite to the first electrode;

disposing a liquid crystal layer comprising a plurality of liquid crystal molecules and monomers between the first electrode and the second electrode; and forming a color filter between the first substrate and the first electrode, wherein the color filter corresponding to the reflective area comprises a hole and the monomers corresponding to the reflective area are polymerized by ultraviolet irradiation from the hole.

2. The method of fabricating a transflective display as claimed in claim 1, wherein the monomers have a weight ratio of about 0.1-5%.

3. The method of fabricating a transflective display as claimed in claim 1, wherein the monomers are polymerized by the ultraviolet irradiation to form a plurality of polymers adjacent to the first electrode and the second electrode.

4. The method of fabricating a transflective display as claimed in claim 1, further comprising forming a protrusion on the first electrode corresponding to the reflective area.

5. The method of fabricating a transflective display as claimed in claim 1, further comprising forming a reflective electrode on the reflective area of the second substrate.

6. The method of fabricating a transflective display as claimed in claim 1, further comprising forming a reflective layer on the reflective area of the second substrate.

7. The method of fabricating a transflective display as claimed in claim 6, further comprising forming an insulation layer between the reflective layer and the second electrode.

8. The method of fabricating a transflective display as claimed in claim 1, further comprising forming a dielectric layer between the color filter and the first electrode corresponding to the reflective area.

9. The method of fabricating a transflective display as claimed in claim 1, wherein the monomers have a weight ratio of about 0.1-20%.

* * * * *